(12) United States Patent
Jaakkola (10) Patent No.: US 7,616,974 B2
(45) Date of Patent: Nov. 10, 2009

(54) KEYPAD WITH PIVOTABLE SECTIONS

(75) Inventor: Mikael Jaakkola, Turku (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 10/917,831

(22) Filed: Aug. 13, 2004

(65) Prior Publication Data

US 2006/0035678 A1 Feb. 16, 2006

(51) Int. Cl.
*H04M 1/00* (2006.01)
*H04B 7/00* (2006.01)

(52) U.S. Cl. .................. 455/575.3; 455/566; 455/575.1; 455/556.2; 455/425; 455/66.1; 455/90.3

(58) Field of Classification Search ... 455/575.1–575.3, 455/425, 550.1, 66.1, 90.3, 556, 556.1–566, 455/347–348, 449; 379/433.01, 433.04, 379/433.07
See application file for complete search history.

(56) References Cited

U.S. PATENT DOCUMENTS

| | | | |
|---|---|---|---|
| 6,055,153 A | 4/2000 | Chiu et al. | |
| 6,834,199 B2 * | 12/2004 | Hyun et al. | 455/575.1 |
| 6,983,175 B2 * | 1/2006 | Kwon | 455/575.1 |
| 7,206,616 B2 * | 4/2007 | Choi | 455/575.1 |
| 7,336,979 B2 * | 2/2008 | Soejima | 455/575.1 |
| 2002/0132640 A1 | 9/2002 | Hyun et al. | |
| 2003/0078069 A1 * | 4/2003 | Lindeman | 455/550 |
| 2005/0070328 A1 * | 3/2005 | Wang et al. | 455/575.1 |

FOREIGN PATENT DOCUMENTS

| | | |
|---|---|---|
| EP | 1 265 127 | 12/2002 |
| EP | 1 396 982 | 3/2004 |
| EP | 1 551 156 | 7/2005 |
| GB | 2 375 683 | 11/2002 |
| WO | WO 2004/019596 A2 * | 3/2004 |

* cited by examiner

*Primary Examiner*—Charles N Appiah
*Assistant Examiner*—Emem Stephen
(74) *Attorney, Agent, or Firm*—Ware, Fressola, Van Der Sluys & Adolphson

(57) ABSTRACT

The invention relates to a device comprising a display and a keypad. To allow easy text input, the keypad is divided into at least two sections, each of the sections being pivotable around an axis.

20 Claims, 5 Drawing Sheets

KEYPAD WITH PIVOTABLE SECTIONS

BACKGROUND OF THE INVENTION

1. Field of the Invention

The invention relates to a device comprising a display with a case and a keypad.

2. Discussion of Related Art

Current electronic devices, such as mobile phones, mobile gaming devices, mobile personal digital assistants and others, comprise a display, displaying text and graphics as well as keypads for text input and controlling the devices.

It is known to provide mobile phones with a display and a keypad, which are pivotable against each other. Pivotable may comprise swinging and rotating the keypad around an axis. In these so called clam shell form factor devices, the keypad can be pivoted around an axis which is parallel to the display plane and parallel lower and upper boundary of the display. The keypad can be rotated onto the display with the keys facing the display in closed state. When operating these devices, the keypad can be swung into an open state, such that the display and the keys are directed in the direction of the user.

It is also known to provide mobile phones with sliding keypads. These sliding form factor devices enable sliding the keypad back and forth from the case. It can also be possible to slide a cover protecting the keypad into a position giving free access to the keypad.

However, there is a growing need for credible concepts in the mobile world for text entry and gaming. In particular, ergonomics and usability are important for a text input or a mobile gaming. However, current keypads do not allow text input as is possible with common computer keyboards. The horizontal distance between the keys on the keypad needs to be increased to allow improved text input.

BRIEF SUMMARY OF THE INVENTION

To provide easy text input, implementation of the invention provide a device comprising a display within a case and a keypad, wherein the keypad is divided into at least two sections each of which comprises at least one key of the keypad, and the sections are pivotable around at least one axis.

By sectioning the keypad into two sections, these two sections can be pivoted against each other to increase the horizontal distance between the keys on the keypad. For instance, having two sections and rotating these sections each by 90 degree in a plane parallel to the display plane would enable providing a keypad which is similar to a typewriter keyboard.

Attaching each of the sections pivotable_around a single common axis, as provided by one implementation, enables increasing the horizontal distance between the keys of the keyboard. A similar effect results when two adjacent axes are used each section pivotable about a respective one of the axes.

Another implementation provides an axis which is projecting from the case. The axis may be provided by pins, bolts, or bosses, or any other suitable means. The sections of the keypad may be attached to the projecting axis, enabling swinging the sections around this axis.

A further implementation provides the axis orthogonal to a display plane of the display. In such an implementation, the sections are pivotable in a plane, which is parallel to the display plane. The orthogonal axis connects the display case with the sections. The sections may be pivoted into a closed position, where they can at least partially cover the display. When pivoting the sections in an open position, the display is uncovered. The plane of the sections of the keyboard can be parallel to the display plane.

According to another implementation, at least one axis is provided by a pin projecting from the case. This pin enables securing the sections pivotably to the case.

A compact design may be provided by connecting the sections to only one single axis. This one axis may be formed by a bolt, pin or boss or any other means and can project from the case. The sections may be connected to this one axis and can be pivoted around this axis.

To increase usability enabling adjusting the display plane and the keypad plane to each other, an implementation provides the display plane and the axis pivotable against each other. In such a case, the display may be pivoted, for instance, in an up-right position, still having the plane of the keypad parallel to a table or the ground. The angle between the display plane and the plane of the sections may be variable.

To enable easy text input, an implementation provides sections that are pivotable in the same plane. These sections enable easy text input, as the keys of the sections are substantially in the same plane.

A further implementation provides that the sections are pivotable in a plane parallel to the display plane. This enables a compact design.

To enable connecting the sections to the axis, an implementation provides at least one section with a take-up for connecting to the axis. The take-up may be a borehole or an aperture enabling connecting the section to the axis, which can be a pin, bolt or boss and enabling pivoting the section around the axis.

Further, an implementation provides the take-ups at an upper or a lower end of the sections. This assembly enables pivoting the sections against each other in a same plane without obstructing each other.

Another implementation provides side arms connecting the take-ups with the keys of the keypad. The side arms can, according to a further implementation, be formed to provide at least one aperture between the sections in closed position providing at least one view onto at least a part of the display. In this implementation, a user may see the display even without swinging the sections apart.

To provide communication of electrical signals, the pin provides electrical connections between electrical components within the case and the keypad, according to an implementation.

Further, wireless communication is provided using a wireless communication device. This enables communicating inputs with the keypad to a remote device.

The device may be suited for mobile communication, mobile gaming, or remote controlling according to further implementations.

Another implementation enables detaching the keypad from the display wherein the display is comprised within a first case and the sections and the axis are assembled with each other in an assembly, and the case and the assembly are detachable. According to this implementation, the pin may be arranged within the case of the display, in such a way that it can be removed from the case. The pin fastens the sections with each other still being pivotable around the pin. In this implementation, the keypad with its pivotable sections may be used separately from the display.

To enable communication between elements within the first case and elements within the assembly, wireless communication elements are arranged within the case and the assembly, respectively. These wireless communication elements may, for instance, be bluetooth communication elements or any other elements supporting wireless communication protocols.

DETAILED DESCRIPTION OF THE INVENTION

Figure 1:
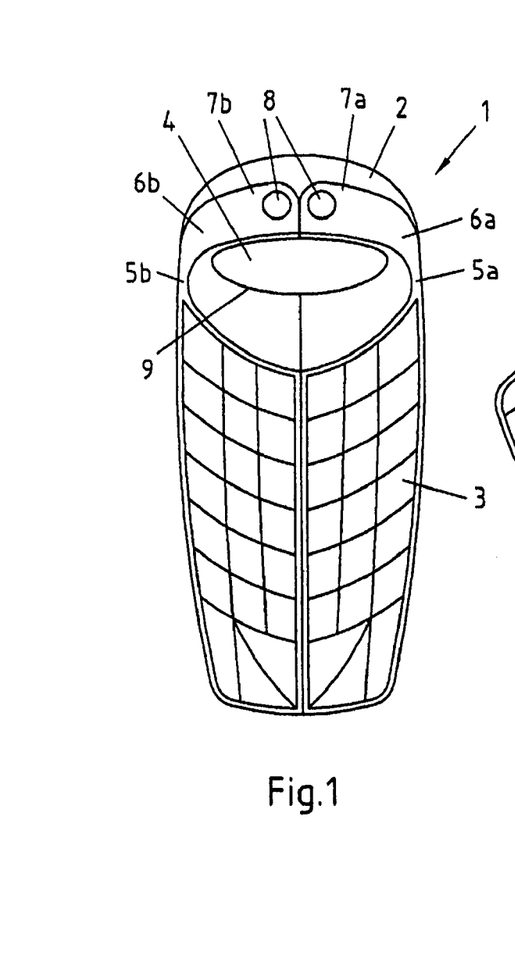
FIG. 1 a device with two rotational axes in closed position.

FIG. 1 shows an implementation of a device 1 according to the invention. The device 1 comprises a case 2, with a display 4. From case 2, two pins 8 are projecting, providing a rotation axis for rotating the sections 6*a*, 6*b* of a keypad, respectively.

The sections 6*a*, 6*b* comprise keys 3, which together form a whole keypad. The keys 3 are connected by side arms 5*a*, 5*b* with take-ups 7*a*, 7*b* for connecting the sections 6*a*, 6*b* to the pins 8. The two pins 8 are arranged such that the sections 6*a*, 6*b* can be rotated around the pins 8 without obstructing each other. FIG. 1 shows a closed position of device 1, where the sections 6*a*, 6*b* are located close to each other. The side arms 5*a*, 5*b* are formed such that an aperture 9 is formed. This aperture 9 enables a direct view onto display 4 even in the depicted closed position of the sections 6*a*, 6*b*.

Figure 2:
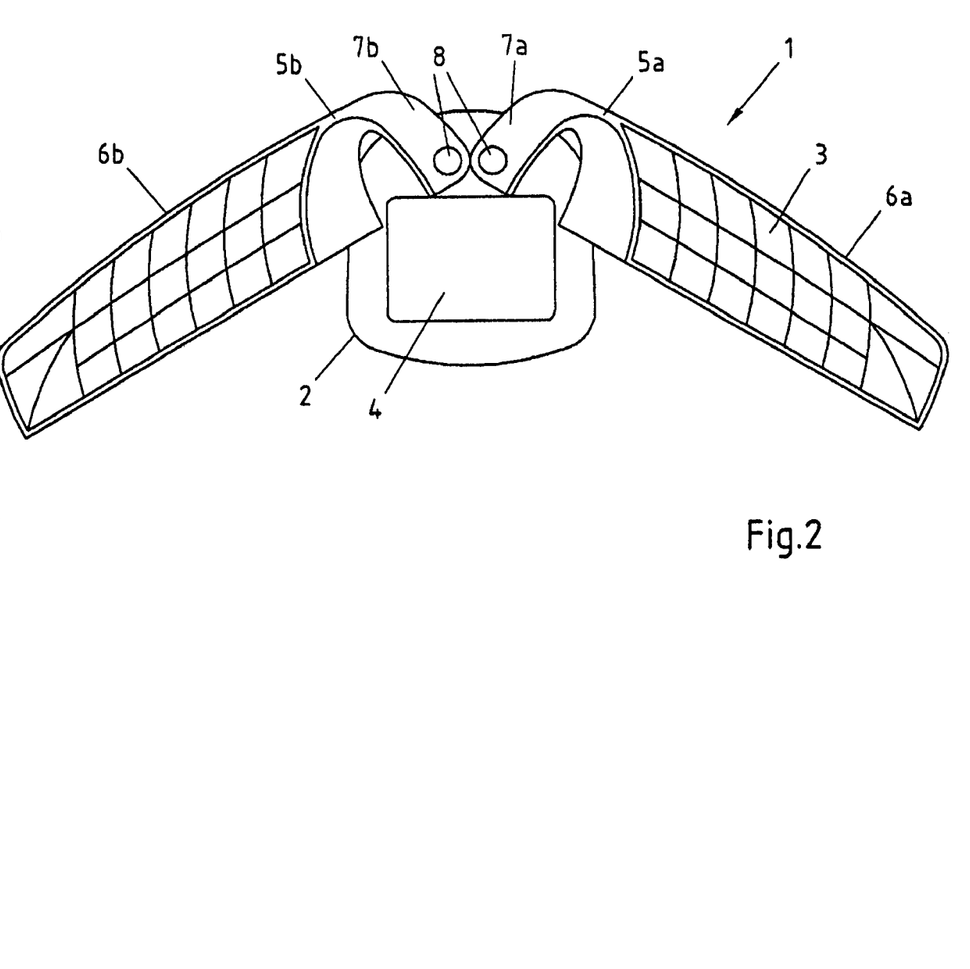
FIG. 2 a device with two rotational axes in open position.

FIG. 2 shows a device 1 as shown in FIG. 1 with the same elements, denoted by the same reference numbers. The sections 6*a*, 6*b* are rotated around the pins 8 into an open position. Within this open position, the keys 3 of the sections 6*a*, 6*b* have an increased horizontal distance. Text input is made easier, as users may use both hands when inputting text. Inputting text with ten fingers is possible with the sections 6*a*, 6*b* being swung into the depicted open position. As can be seen, the arrangement of pins 8 and take ups 7*a*, 7*b* is such, that even when swinging the sections 6*a*, 6*b* around the pins 8, the sections do not obstruct each other. In open position, the user has a direct view onto display 4, which is not obstructed at all by the sections 6*a*, 6*b*.

Figures 3, 4, 5:
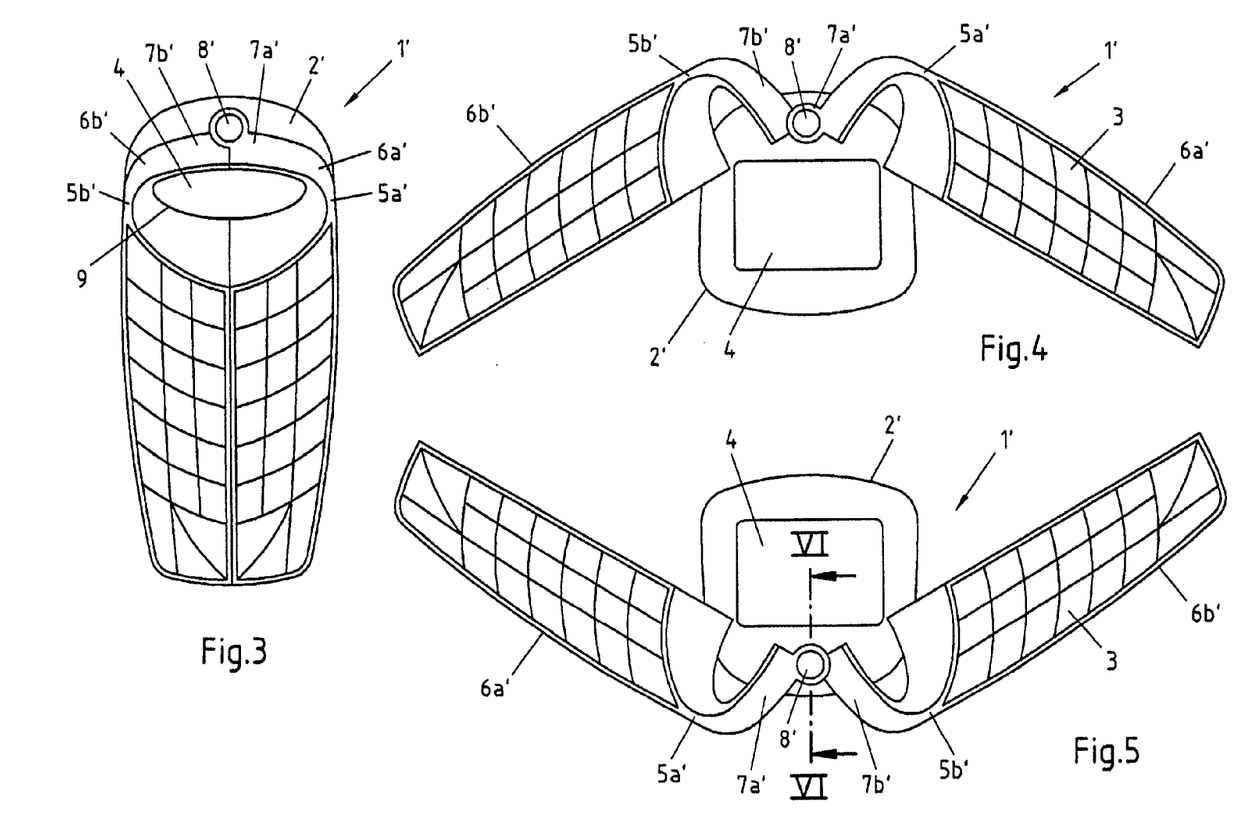
FIG. 3 a device with one rotational axis in closed position.
FIG. 4 a device with one rotational axis in open position.
FIG. 5 a device as depicted in FIG. 4 with a different orientation of the display.

FIG. 3 shows a similar device 1' as already depicted in FIG. 1. This device 1' is comprised of same elements, which are denoted by dashed reference numbers. The difference between device 1' and device 1 is that only one pin 8' is provided. Pin 8' is projecting from case 2'. Take ups 7*a'*, 7*b'* are arranged such that both sections 6*a'*, 6*b'* can be fastened to pin 8'. Further, take ups 7*a'*, 7*b'* are connected to sections 6*a'*, and 6*b'* with side arms 5*a'*, 5*b'*. The sections 6*a'*, 6*b'* can be pivoted around pin 8' without obstructing each other. FIG. 3 shows the closed position of device 1'. The side arms 5*a'*, 5*b'* provide an aperture 9, as already depicted in FIG. 1. However, the side arms may also be formed not providing an aperture 9 and thereby covering display 4.

FIG. 4 shows device 1' as shown in FIG. 3 in an open position. Again, the horizontal distance between the keys 3 located on the sections 6*a'*, 6*b'* is increased to enable easy text input.

FIG. 5 shows a device 1' as shown in FIG. 4 with the display being oriented in another position. The display may be controlled such that the text or the content within the display is presented to the user in the correct orientation. With the device as shown in FIG. 5, the orientation of the content within the display 4 is shifted by 180° against the orientation of the content within the display 4 as shown in FIG. 4. The keys within sections 6*a'*, 6*b'* as shown in FIG. 5 provide even better ergonomics.

Figure 6:
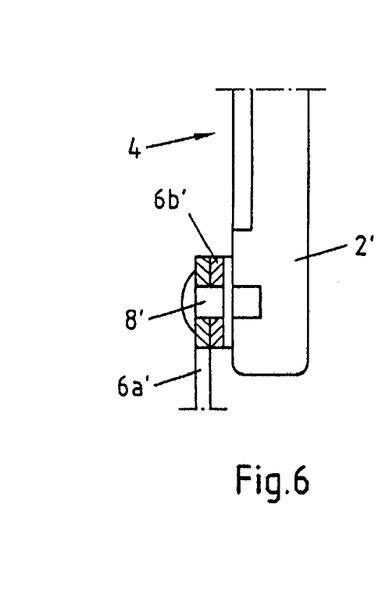
FIG. 6 a sectional view of a section as depicted in FIG. 5.

FIG. 6 is a sectional view of a device 1' as indicated in FIG. 5. Shown is a pin 8' to which connected are sections 6*a'*, 6*b'*. The pin is fastened within case 2'. The sections are fastened to pin 8' by discs.

Figure 7:
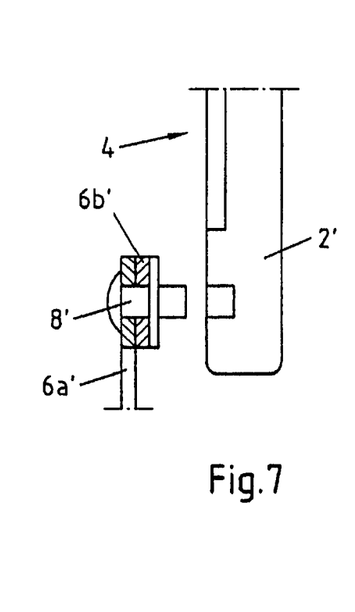
FIG. 7 an exploded view of the sectional view shown in FIG. 6.

The pin 8' may be fastened detachably to case 2'. This enables demounting the pin 8' together with the sections 6*a'*, 6*b'* from case 2', as is depicted in FIG. 7. Such an arrangement enables using the keypad separately from case 2' and display 4'. In such an arrangement, communication between elements within case 2' and the keypad may be enabled using wireless communication. For instance, communication elements (not depicted) within case 2' and sections 6*a'*, 6*b'* can provide wireless communication. This wireless communication may, for instance, be Bluetooth™ communication or (according to) any other communication protocol.

Figure 8:
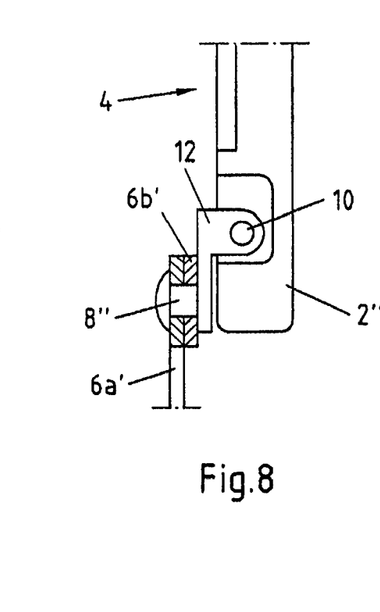
FIG. 8 another sectional view with an axis for pivoting the display and the section against each other.
Figure 9:
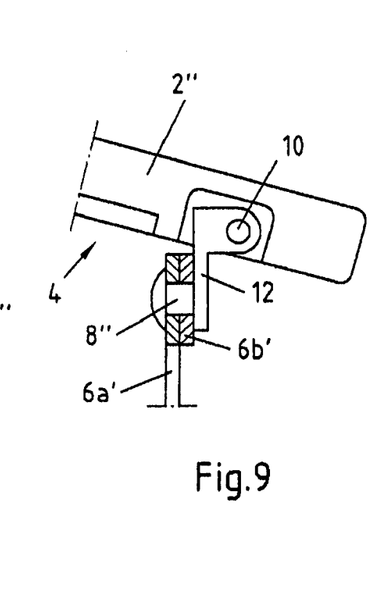
FIG. 9 a sectional view of the device as shown in FIG. 8 with the display and the sections rotated against each other.

FIG. 8 shows an arrangement, where pin 8" is connected to an arm 12. Arm 12 provides a connection to pin 10, which axis is orthogonal to the axis of pin 8". Providing this arrangement enables pivoting the plane of sections 6*a'*, 6*b'* around pin 8" and arm 12 around pin 10. This enables, on the one hand, pivoting the section 6*a'*, 6*b'* such that the horizontal distance between the keys 3 is increased. And, on the other hand, pivoting case 2" around pin 10 to change the angle between the sections 6*a'*, 6*b'* and display 4.

The previously described embodiments showed sections 6*a*, 6*b* in a plane parallel to the plane of display 4. With an implementation as depicted in FIGS. 8, 9, 10, 11, the angle between display 4 and sections 6*a'*, 6*b'* may be changed. In this case, the plane of the sections 6*a'*, 6*b'* need not to be parallel to the plane of the display 4. The display may, for instance, be rotated by any angle between 0° and 90°, for example into an upright position.

Figure 10:
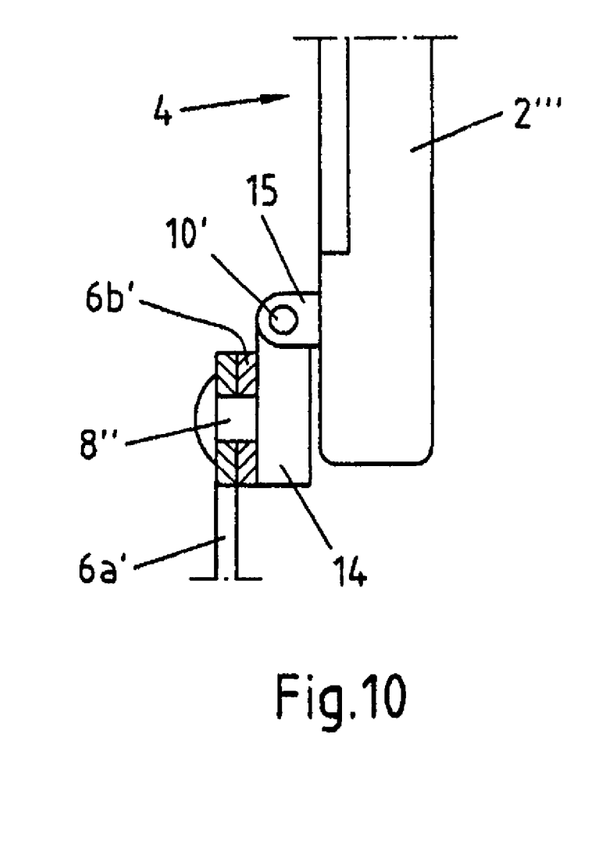
FIG. 10 another implementation for rotating the display and the sections against each other.

FIG. 10 shows a similar arrangement, where arm 14 connects pin 8" with pin 10'. Pin 10' is located outside case 2''', for instance, connected to boss 15. This arrangement enables rotating case 2''' against the plane of sections 6*a'*, 6*b'* with a higher degree of freedom. The case 2''' does not obstruct rotating arm 14 around pin 10' by more than 90°.

Figure 11:
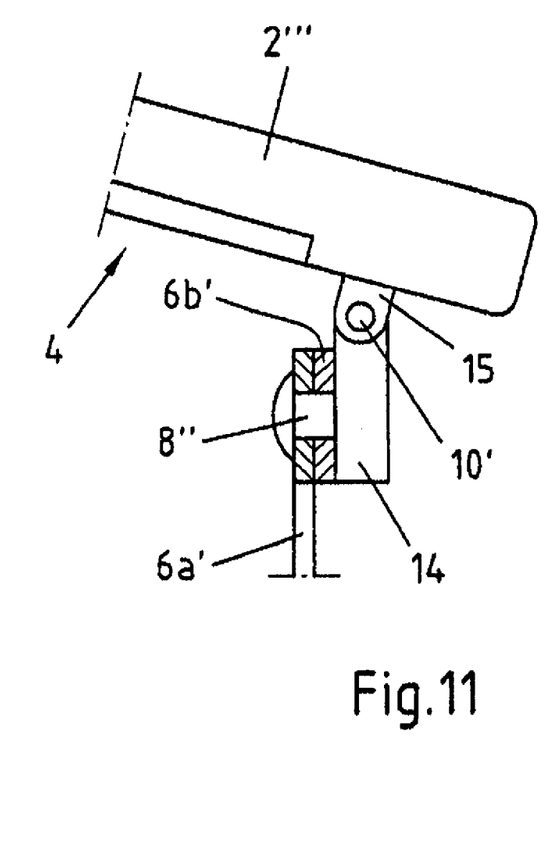
FIG. 11 an implementation as shown in FIG. 10 with the display and the sections rotated against each other.

FIG. 11 shows a position, where case 2''' is rotated around axis 10' to provide an angle between the plane of the display 4 and the plane of sections 6*a'*, 6*b'*.

Figure 12:
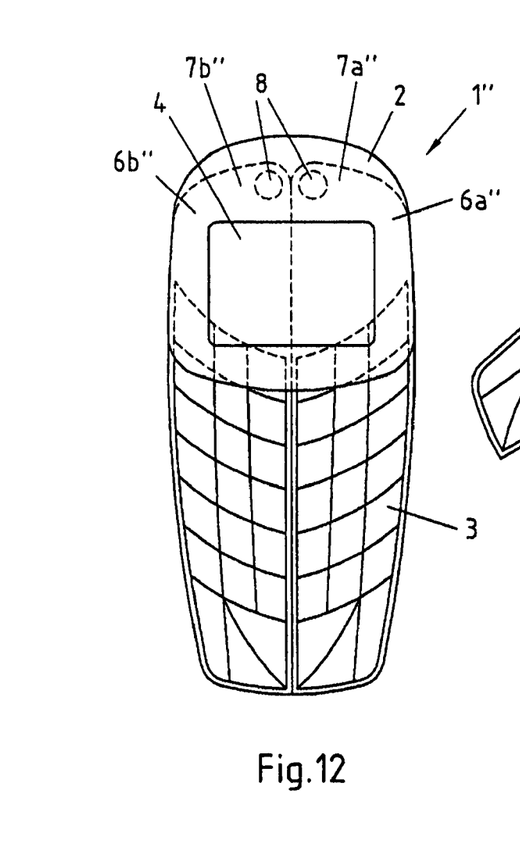
FIG. 12 a further implementation with the sections located behind the display in closed position.

FIG. 12 shows another possible implementation of a device 1". According to this implementation, the two pins 8 are located on the side opposite to display 4 on case 2. In this arrangement, display 4 is always unobstructed by sections 6*a"*, 6*b"*. The display 4 is always in front of the sections 6*a"*, 6*b"*. The sections 6*a"*, 6*b"* are connected to pins 8 by take-ups 7*a"*, 7*b"*. Shown in FIG. 12 is the closed position of sections 6*a"*, 6*b"*.

Figure 13:
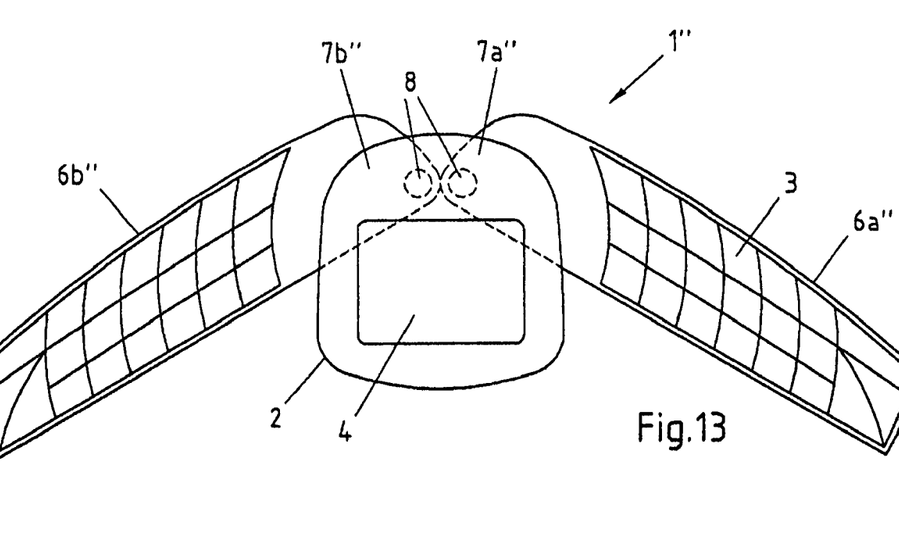
FIG. 13 a device as depicted in FIG. 12 in open position.

Shown in FIG. 13 is the device 1'' in an open position, where the sections 6a'', 6b'' are rotated against the pins 8. Again, this position of sections 6a'', 6b'' enables easy text input.

What is claimed is:

1. An apparatus comprising:
a display within a case; and
a keypad;
wherein the keypad is divided into at least two sections each of which comprises at least one key of the keypad;
wherein the sections are pivotable around at least one axis; and
side arms are formed to provide at least one aperture between the sections in closed position providing at least one view onto at least a part of the display wherein in the closed position the sections are arranged in front of the display.

2. The apparatus of claim 1, wherein a second axis is connected to the at least one axis, wherein the second axis is arranged orthogonally to the at least one axis, and wherein the display is pivotable around the second axis, such that the display plane and the at least one axis are pivotable against each other.

3. The apparatus of claim 1, wherein the sections are pivotable in a plane parallel to a display plane.

4. The apparatus of claim 1, wherein at least one section comprises a take up for connecting to the at least one axis.

5. The apparatus of claim 4, wherein the take up is located at an upper or lower end of the section.

6. The apparatus of claim 4, wherein the take up and keys of the keyboard are connected by side aims.

7. The apparatus of claim 2, wherein the at least one axis is a single common axis and the sections are connected to said single common axis.

8. The apparatus of claim 1, wherein the at least one axis projects from the case.

9. The apparatus of claim 1, wherein the at least one axis is orthogonal to a display plane of the display.

10. The apparatus of claim 1, wherein the at least one axis is provided by a pin projecting from the case.

11. The apparatus of claim 1, wherein the at least one axis is a single common axis and the sections are connected to said single common axis.

12. The apparatus of claim 1, wherein the display plane and the at least one axis are pivotable against each other.

13. The apparatus of claim 1, wherein the sections are pivotable in a same plane.

14. The apparatus of claim 1, wherein the sections are pivotable in a plane parallel to a display plane.

15. The apparatus of claim 1, further comprising a wireless communication device for 16. The apparatus of claim 1, comprising a mobile communication module for mobile communication, a gaming module for gaming, or a remote module for remote controlling, or both.

17. The apparatus of claim 1, wherein the display is comprised within a first case and the sections and the axes are arranged at a second case, and the first and second cases are detachable.

18. The apparatus of claim 1, wherein wireless communication elements for communication between elements within the first case and elements within the second case are arranged within each of the cases, respectively.

19. An apparatus comprising:
means for displaying a graphic, wherein said means for displaying are within a case; and
means for controlling said apparatus;
wherein the means for controlling are divided into at least two sections each of which comprises at least one means for inputting;
wherein said sections are pivotable around at least one axis;
wherein a second axis is connected to the at least one axis; and
wherein side arms are formed to provide at least one aperture between the sections in closed position providing at least one view onto at least a part of the means for displaying wherein in the closed position the sections are arranged in front of the means for displaying.

20. A method comprising:
providing a display within a case; and
providing a key pad;
wherein the key pad is divided into at least two sections each of which comprises at least one key of the key pad;
wherein the sections are pivotable around at least one axis; and
wherein side arms are formed to provide at least one aperture between the sections in closed position providing at least one view onto at least a part of the display wherein in the closed position the sections are arranged in front of the display.

* * * * *

UNITED STATES PATENT AND TRADEMARK OFFICE
CERTIFICATE OF CORRECTION

| | |
|---|---|
| PATENT NO. | : 7,616,974 B2 |
| APPLICATION NO. | : 10/917831 |
| DATED | : November 10, 2009 |
| INVENTOR(S) | : Mikael Jaakkola |

Page 1 of 1

It is certified that error appears in the above-identified patent and that said Letters Patent is hereby corrected as shown below:

In column 5, line 32, which is claim 6, line 2, "aims" should be --arms--.

In column 6, line 6, which is claim 15, line 2, "for" should be --for providing wireless communication of an input entered into the keypad to a remote device--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,616,974 B2  Page 1 of 1
APPLICATION NO. : 10/917831
DATED : November 10, 2009
INVENTOR(S) : Mikael Jaakkola It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Nineteenth Day of October, 2010

David J. Kappos
*Director of the United States Patent and Trademark Office*